United States Patent
Voigt et al.

(10) Patent No.: US 12,075,892 B2
(45) Date of Patent: Sep. 3, 2024

(54) MOLD-IN FASTENER PRODUCTS

(71) Applicant: Velcro IP Holdings LLC, Manchester, NH (US)

(72) Inventors: Paul Joseph Voigt, Waterdown (CA); Victor Horst Kheil, Kitchener (CA); Mark A. Clarner, Hopkinton, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 244 days.

(21) Appl. No.: 17/864,936

(22) Filed: Jul. 14, 2022

(65) Prior Publication Data

US 2023/0032238 A1   Feb. 2, 2023

Related U.S. Application Data

(60) Provisional application No. 63/226,780, filed on Jul. 29, 2021.

(51) Int. Cl.
*A44B 18/00* (2006.01)
*B29C 43/22* (2006.01)
*B29C 43/46* (2006.01)

(52) U.S. Cl.
CPC ...... *A44B 18/0076* (2013.01); *A44B 18/0015* (2013.01); *A44B 18/0049* (2013.01);
(Continued)

(58) Field of Classification Search
CPC . A44B 18/00; A44B 18/0015; A44B 18/0049; A44B 18/0061; A44B 18/0076;
(Continued)

(56) References Cited

U.S. PATENT DOCUMENTS

| 4,398,715 A | 8/1983 | Hall |
| 4,710,414 A | 12/1987 | Northrup et al. |

(Continued)

FOREIGN PATENT DOCUMENTS

| AT | 264770 B | 9/1968 |
| EP | 2269480 A1 | 1/2011 |
| GB | 2364351 A | 1/2002 |

OTHER PUBLICATIONS

International Search Report and Written Opinion in International Appln. No. PCT/IB2011/002861, dated May 11, 2012, 9 pages.

(Continued)

*Primary Examiner* — Yunju Kim
(74) *Attorney, Agent, or Firm* — Fish & Richardson P.C.

(57) ABSTRACT

Mold-in fastener products are made by forming a longitudinally continuous hook tape having a flexible base and an array of discrete male touch fastener elements extending from an upper surface of the base, forming a layer of flexible barrier material on the upper surface of the base, such that the male touch fastener elements are embedded in the layer of flexible barrier material, severing the flexible barrier material to form a pattern of patches of flexible barrier material spaced apart and surrounded by a continuous lattice of barrier material, stripping the lattice from the upper surface of the base to expose regions of the base between patches, and severing the hook tape along the exposed regions of the base to form individual mold-in fastener products, each having a patch of flexible barrier material surrounded by an exposed base edge region carrying male touch fastener elements.

18 Claims, 8 Drawing Sheets

(52) U.S. Cl.
CPC ........ *A44B 18/0061* (2013.01); *B29C 43/222* (2013.01); *B29C 43/46* (2013.01); *B29C 2043/461* (2013.01); *B29C 2043/464* (2013.01)

(58) Field of Classification Search
CPC ..... B29C 43/20; B29C 43/203; B29C 43/222; B29C 43/46; Y10T 83/04
See application file for complete search history.

(56) References Cited

U.S. PATENT DOCUMENTS

| | | | |
|---|---|---|---|
| 4,732,631 A | 3/1988 | Shimizu | |
| 4,775,310 A | 10/1988 | Fischer | |
| 4,842,916 A | 6/1989 | Ogawa et al. | |
| 5,067,210 A | 11/1991 | Keyaki | |
| 5,260,015 A | 11/1993 | Kennedy et al. | |
| 5,286,431 A * | 2/1994 | Banfield | A44B 18/0076 264/274 |
| 5,500,268 A | 3/1996 | Billarant | |
| 5,540,970 A * | 7/1996 | Banfield | A44B 18/0049 24/444 |
| 5,579,562 A | 12/1996 | Hattori et al. | |
| 5,606,781 A | 3/1997 | Provost et al. | |
| 5,688,576 A | 11/1997 | Ohno et al. | |
| 5,700,340 A | 12/1997 | Johnson et al. | |
| 5,786,061 A | 7/1998 | Banfield | |
| 6,730,069 B2 | 5/2004 | Tanzer et al. | |
| 6,896,759 B2 | 5/2005 | Fujisawa et al. | |
| 7,022,394 B2 | 4/2006 | Fujisawa et al. | |
| 7,108,814 B2 | 9/2006 | Herrero et al. | |
| 7,608,070 B2 | 10/2009 | Chen et al. | |
| 7,927,681 B2 | 4/2011 | Cheng | |
| 7,998,548 B2 | 8/2011 | Murasaki et al. | |
| 8,043,541 B2 | 10/2011 | Nozawa et al. | |
| 9,688,007 B2 | 6/2017 | Cheng | |
| 2004/0103503 A1 | 6/2004 | Leach et al. | |
| 2007/0098953 A1 | 5/2007 | Stabelfeldt et al. | |

OTHER PUBLICATIONS

International Search Report and Written Opinion in International Appln. No. PCT/US2022/073731, dated Oct. 21, 2022, 12 pages.
International Preliminary Report on Patentability in International Appln. No. PCT/US2022/073731, mailed on Feb. 8, 2024, 7 pages.
Office Action in Korean Appln. No. 10-2024-7006927, mailed on May 2, 2024, 8 pages (with English translation).

* cited by examiner

MOLD-IN FASTENER PRODUCTS

TECHNICAL FIELD

This invention relates to making and using mold-in fastener products, such as those that are provided at the surface of molded foam cushions to retain cushion covers.

BACKGROUND

Separable fasteners are used in the manufacture of automobile seats in the attachment of an upholstered seat cover, sometimes called a trim cover, to a polyurethane foam bun. One portion of the separable fastener is incorporated into the surface of the polyurethane seat bun during the foam molding process, and is often referred to as a 'mold-in' product, in that it is molded into the foam. The mating portion of the separable fastener is attached to the seat cover to provide releasable attachment to the foam seat bun. The separable fastener assembly used in the foam mold for incorporation in the bun surface typically is the hooked portion of the separable fastener system. This hook portion has a base carrying resilient fastener elements or hooks on one surface. The surface of the base obverse of the hook-carrying surface may act as an anchoring surface by a variety of configurations well known in the art. In some assemblies a magnetically attractive material is attached to the base to facilitate placement of the assembly in a trough of the mold cavity wall, which is equipped with magnets. A protective layer, often in the form of a thin plastic film, is placed over the resilient hooks, or a gasket provided around the hooks, to prevent incursion of foam into the hooks during the molding process. Significant foam contamination of the hooks would affect their ability to engage with the mating portion of the fastener. Such fastening devices are applied to one surface of a clamshell mold; a chemical mixture, usually of a diisocyanate and a polyol, is injected into a mold. The upper surface of the mold is closed and clamped shut while the chemicals react and blow to form a flexible foam, as known in the art.

SUMMARY

One aspect of the invention features a method of making mold-in fastener products. The method includes severing a layer of flexible barrier material on a surface of a longitudinally continuous hook tape having a flexible base and an array of discrete male touch fastener elements extending from the surface of the base, to form a pattern of patches of flexible barrier material spaced apart and surrounded by a continuous lattice of barrier material, with each of the patches and the lattice engaging male touch fastener elements. The lattice is stripped from the surface of the base to expose male touch fastener elements in exposed regions of the base surrounding each patch of flexible barrier material, and the hook tape is severed along the exposed regions of the base to form individual mold-in fastener products, each having a patch of flexible barrier material surrounded by an exposed base edge region carrying male touch fastener elements.

In some cases the method includes, prior to severing the layer of flexible barrier material, forming the layer of flexible barrier material on the surface of the base, such that the male touch fastener elements are at least partially embedded in the layer of flexible barrier material. In some examples, forming the layer of flexible barrier material includes extruding a continuous flow of barrier material onto the surface of the base and allowing the extruded flow of barrier material to set. In some applications the layer of flexible barrier material is formed to have a thickness, measured from the surface of the base, sufficient to completely cover the embedded male touch fastener elements. In some cases the layer of flexible barrier material is formed to encapsulate heads of the male touch fastener elements.

In some embodiments the method includes, prior to forming the layer of flexible barrier material, forming the longitudinally continuous hook tape. For example, forming the longitudinally continuous hook tape may include forming the flexible base against a surface of a rotating mold roll while molding at least stems of the male touch fastener elements in discrete cavities defined in the mold roll, and then stripping the flexible base from the mold roll surface, thereby extracting the molded stems from the cavities. The cavities may be shaped to mold both the stems and the heads of the male touch fastener elements.

In some cases each of the patches and the lattice contain embedded male touch fastener elements.

The flexible barrier material may include, for example, an elastomer, polyvinyl chloride, and/or a textile sheet.

The flexible barrier material may include a magnetically attractable material, such as in the form of particles suspended in a resin matrix.

In some cases the hook tape includes a magnetically attractable material, such as in the form of a continuous metal wire.

In some examples the male touch fastener elements each have a stem formed contiguously with the surface of the base, and a head disposed at a distal end of the stem and overhanging the surface of the base.

Preferably, a ratio of maximum to minimum lateral extent of the patch of flexible barrier material is between 1.0 and 10.

Severing the flexible barrier material may include die cutting through the flexible barrier material and not through the flexible base of the hook tape.

Severing the hook tape may include die cutting through the flexible base of the hook tape between patches of flexible barrier material.

Another aspect of the invention features another method of making a mold-in fastener product. This method includes forming a layer of flexible barrier material on a surface of a longitudinally continuous hook tape having a flexible base with longitudinal edges and an array of discrete male touch fastener elements extending from the surface of the base, such that at least some of the male touch fastener elements are at least partially embedded in the layer of flexible barrier material, severing the layer of flexible barrier material to form a continuous patch of flexible barrier material extending along a central portion of the longitudinally continuous hook tape and spaced from the longitudinal edges of the flexible base, and cutting through the longitudinal edges of the hook tape to form notches extending toward a center of the hook tape.

In some embodiments, severing the layer of fastener material also forms two strips of barrier material extending along the longitudinal edges of the base and separated by the continuous patch of barrier material. The method also includes stripping the strips of barrier material from the surface of the base to expose male touch fastener elements in exposed edge regions of the base.

In some cases, severing the layer of barrier material forms notches in longitudinal edges of the continuous patch that align with the notches formed by cutting through the longitudinal edges of the hook tape.

Another aspect of the invention features yet another method of making a mold-in fastener product. The method includes severing a layer of flexible barrier material on a surface of a longitudinally continuous hook tape having a flexible base with longitudinal edges and an array of discrete male touch fastener elements extending from the surface of the base, to form at least one patch of flexible barrier material between two strips of barrier material extending along the longitudinal edges of the base, with the at least one patch and the strips engaging male touch fastener elements, stripping the strips of barrier material from the surface of the base to expose male touch fastener elements in exposed edge regions of the base, and cutting through the longitudinal edges of the hook tape to form notches extending toward a center of the hook tape.

In some cases, cutting through the longitudinal edges of the hook tape includes forming pairs of longitudinally aligned notches separated by segment bridges.

In some examples, cutting through the longitudinal edges of the hook tape includes cutting through longitudinal edges of the at least one patch.

The layer of flexible barrier material may be severed prior to cutting through the longitudinal edges of the hook tape.

The strips of barrier material may be stripped prior to cutting through the longitudinal edges of the hook tape.

Another aspect of the invention features a method of forming a seat cushion The method includes placing a touch fastener product against an inner surface of a mold cavity, the touch fastener including a piece of flexible hook tape carrying an array of touch fastener elements extending from a surface of the flexible hook tape. The surface has a central region in which the touch fastener elements are embedded in a patch of flexible barrier material, and an edge region surrounding the central region and in which touch fastener elements are exposed. The touch fastener product is placed such that the patch of flexible barrier material is against the inner surface and the exposed touch fastener elements are facing the inner surface. A flow of foamable resin is introduced to the mold cavity, such that the foamable resin expands and flows about the exposed touch fastener elements. The expanded foamable resin is allowed to solidify into a molded foam cushion, and the molded foam cushion is removed from the mold cavity.

In some embodiments, the patch of flexible barrier material is exposed at a surface of the removed molded foam cushion. The method may also include stripping the patch of flexible barrier material from the surface of the flexible hook tape to expose the embedded touch fastener elements, leaving the piece of flexible hook tape secured to the cushion with the edge region embedded in molded foam.

In some cases, the patch of flexible barrier material remains at the inner surface of the mold cavity as the molded foam cushion is removed.

Another aspect of the invention features a mold-in fastener product. The product includes a hook sheet having a flexible base and an array of discrete male touch fastener elements extending from an upper surface of the base in both a central area of the upper surface and in edge regions of the upper surface, and a layer of flexible barrier material disposed over the upper surface of the base, with the male touch fastener elements in the central area of the upper surface embedded in the layer of flexible material. The male touch fastener elements in the edge regions of the upper surface of the base, on either side of the layer of flexible barrier material, are exposed.

In some embodiments, both the flexible base and the layer of flexible barrier material define notches extending into the central area of the upper surface.

The layer of flexible barrier material may include a layer of resin in which heads of the male touch fastener elements are encapsulated.

The layer of flexible barrier material may include a textile fabric in which heads of the male touch fastener elements are embedded.

The layer of flexible barrier material may be completely surrounded by edge regions containing exposed male touch fastener elements.

In some examples, the hook sheet is in the form of an elongated strip and the edge regions are disposed along two opposite longitudinal edges of the elongated strip.

In some cases, the flexible base has edges of severed resin.

The flexible barrier material is preferably attached to the hook sheet only by the embedded touch fastener elements and is removable by peeling the flexible barrier material from the hook sheet without damage to the embedded touch fastener elements.

In some configurations, the layer of flexible barrier material is disposed on the upper surface of the flexible base, with the embedded touch fastener elements completely encased in the layer of flexible barrier material.

In some cases, the layer of flexible barrier material is in direct contact with the upper surface between the embedded touch fastener elements.

Preferably, a minimum width of exposed base edge region, measured from the patch of flexible barrier material, is between 2 and 20 percent of a minimum lateral extent of the patch of flexible barrier material.

Various aspects of the invention can provide molded products, such as vehicle seat cushions, with fastening functions provided by embedded mold-in products that can be produced and employed with low unit costs and that become well-anchored within the cushion by virtue of foam encapsulating the fastener elements exposed at their edges, leaving other fastener elements exposed for engagement. The disclosed methods can produce large numbers of discrete mold-in products using advantageously inexpensive, continuous processes.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figures 1, 3:
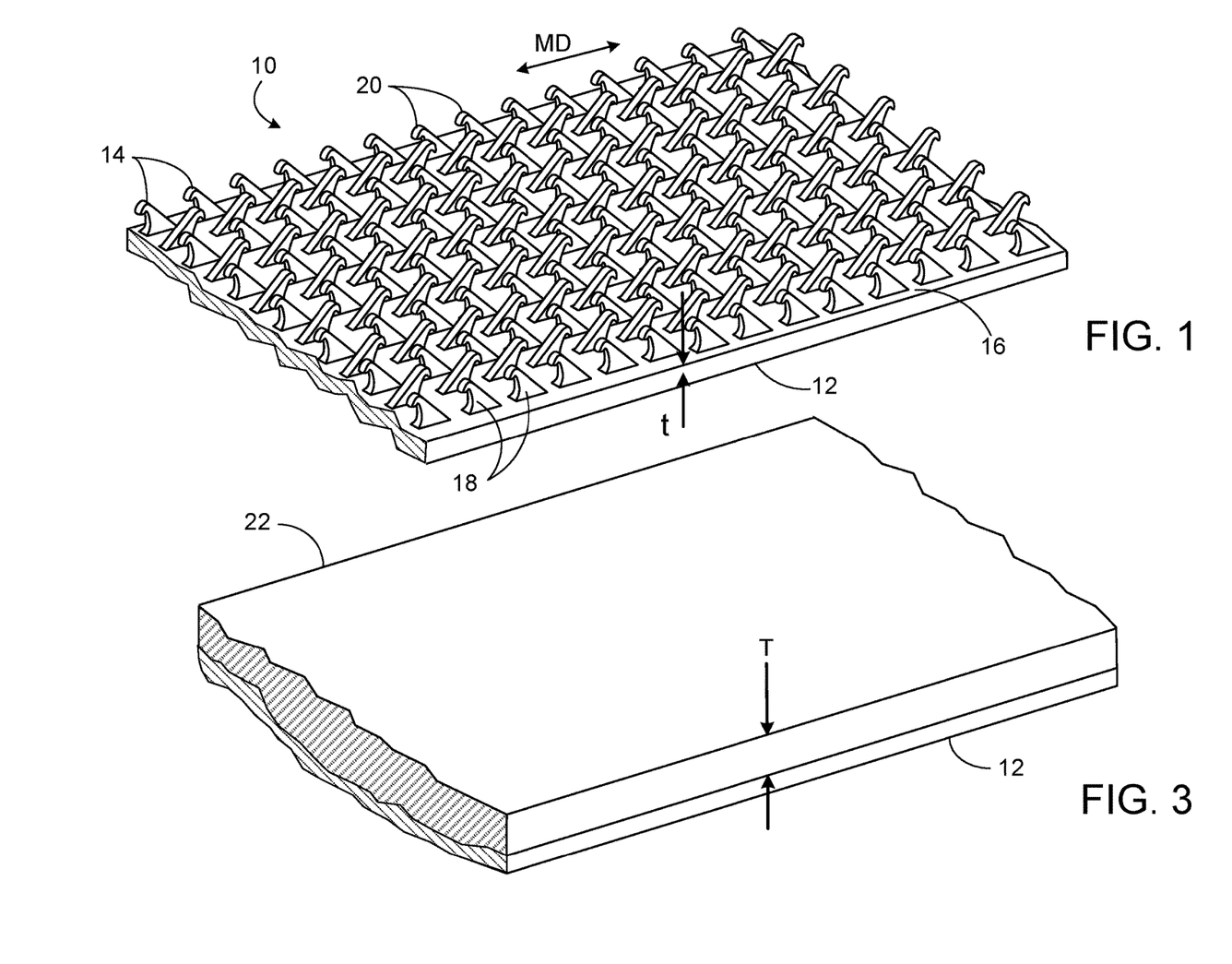
FIG. 1 is a perspective view of a portion of longitudinally continuous hook tape.
FIG. 3 is the hook tape of FIG. 1 with a layer of barrier material applied.

Referring first to FIG. 1, hook tape 10 is longitudinally continuous in a machine direction represented by arrow MD and is of finite width in the transverse direction. Hook tape 10 has a flexible base 12 and an array of discrete male touch fastener elements 14 extending from an upper surface 16 of the base. The tape shown in FIG. 1 is not to proportion. The thickness 't' of the base may be, for example, between 0.1 and 0.4 mm, and the width of the tape in the transverse direction may be 600 mm or more, while in many applications the width will be between 150 and 650 mm. Hook tape 10 is formed of a thermoplastic resin such as polyamide or polypropylene, and due in part to its low thickness it is extremely flexible to bend out of its plane. The male touch fastener elements 14 are schematically illustrated as J-hooks, but may be of any of a number of shapes of touch fastener elements useful for releasably snagging fibers to form a fastening, such as single-crook hooks, bidirectional (palm tree) hooks, mushroom fastener elements with heads overhanging stems in all directions, etc. The male touch fastener elements 14 may be arranged in columns extending in the machine direction, as shown, and adjacent columns may be staggered with respect to one another and have hooks facing in opposing directions. The male touch fastener elements each have a stem 18 formed contiguously with the upper surface 16 of the base 12, and a head 20 disposed at a distal end of the stem and overhanging the upper surface of the base. The male touch fastener elements 14, which are shown enlarged for purposes of illustration, are disposed in an array having a male touch fastener element density of between 75 and 200 elements per square centimeter and have a height, as measured from the upper surface of the base, of only about 0.3 to 2.5 mm. Preferably, the male touch fastener element density is constant across at least the width, more preferably across the width and along the length, of the hook tape.

Figure 2:
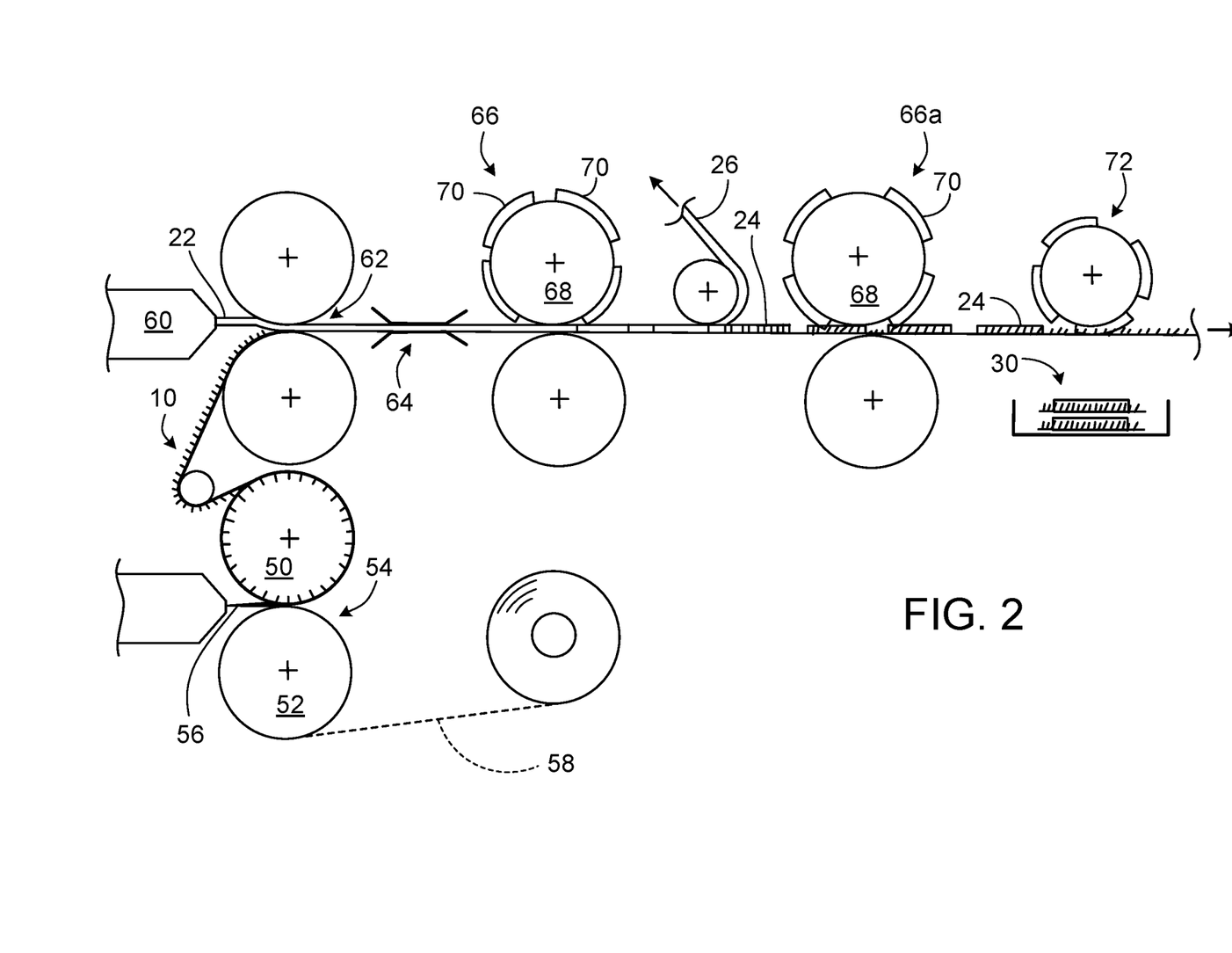
FIG. 2 is a schematic illustration of a method and apparatus for forming mold-in fastener products.

Referring to FIG. 2, hook tape 10 may be formed, for example, by a continuous roll forming process such as that originally taught by Fischer in U.S. Pat. No. 4,775,310, the contents of which regarding roll forming methods and apparatus are incorporated herein by reference. In such a process, the flexible base is formed against a surface of a rotating mold roll 50 while at least the stems (or both the stems and the heads) of the male touch fastener elements are molded in discrete cavities defined in the mold roll. The flexible base is then stripped from the mold roll surface, thereby extracting the molded stems (or stems and heads) from the cavities. The mold roll may be one of a pair of counter-rotating rolls 50 and 52 defining a pressure nip 54 in which flowable resin 56 is pressed into the cavities, forming the fastener element stems contiguously with the surface of the base formed against the mold roll surface. In some cases, a preformed material 58 such as a continuous scrim or other fabric, is introduced to the nip with the resin such that the preformed material is laminated to, or perhaps embedded in, the flexible base, such as taught by Kennedy in U.S. Pat. No. 5,260,015, the contents of which relating to in situ lamination of preformed materials during hook molding are incorporated herein by reference. Nip conditions can be adjusted to leave at least a portion of the preformed material extending from a back side of the hook tape, such as to form a tie layer for bonding to foam.

Referring also to FIG. 3, after the hook tape 10 is formed a layer of flexible barrier material 22 is formed on the upper surface of the base, such that the male touch fastener elements are embedded in the layer of flexible barrier material. Preferably the embedded touch fastener elements are completely encased in the layer of flexible barrier material 22, with the layer of flexible barrier material formed to have a thickness 'T', measured from the upper surface of the base, sufficient to completely cover the embedded male touch fastener elements and the layer of flexible barrier material 22 in direct contact with the upper surface between the embedded touch fastener elements. Preferably, the flexible barrier material 22 is attached to the hook sheet 12 only by the embedded touch fastener elements and is removable by peeling the flexible barrier material from the hook sheet without damage to the embedded touch fastener elements. The barrier material may be extruded onto the hook tape, such as from an extruder 60, and may be pressed against the hook tape in a fixed-thickness nip 62 that controls the thickness of the barrier material and helps to eliminate voids.

The flexible barrier material 22 may be of an elastomer, such as polyvinyl chloride that may be extruded as a continuous flow onto the upper surface of the base and allowed to set. The barrier material may be in the form of a high density, closed cell foam that sets as the tape is pulled through an enclosed channel 64 (or a nip between rollers) that constrains the expansion of the foam. With the hook tape formed of a thermoplastic resin, the flexible barrier material should have a lower melt temperature than the hook tape resin, such that the touch fastener elements and base surface are not significantly altered by the introduction of the barrier material. Preferably, the barrier material is selected so as to not chemically bond, or only lightly bond, with the hook tape resin as it sets, so that the barrier material can be stripped from the hook tape leaving the hook tape undamaged. A foaming agent could be added to a polyvinyl chloride or polyethylene barrier resin, for example, or a thermoset barrier foam may be employed. Selecting the barrier material to have a melting point far from that of the resin of the hook tape can also help to avoid bonding.

The flexible barrier material 22 preferably contains a magnetically attractable component, such as an iron powder distributed within the material. The flexible barrier material may include, for example, between 10 and 20 percent by weight of powdered iron, in a range of 45 to 320 microns in particle size.

Figures 4, 5:
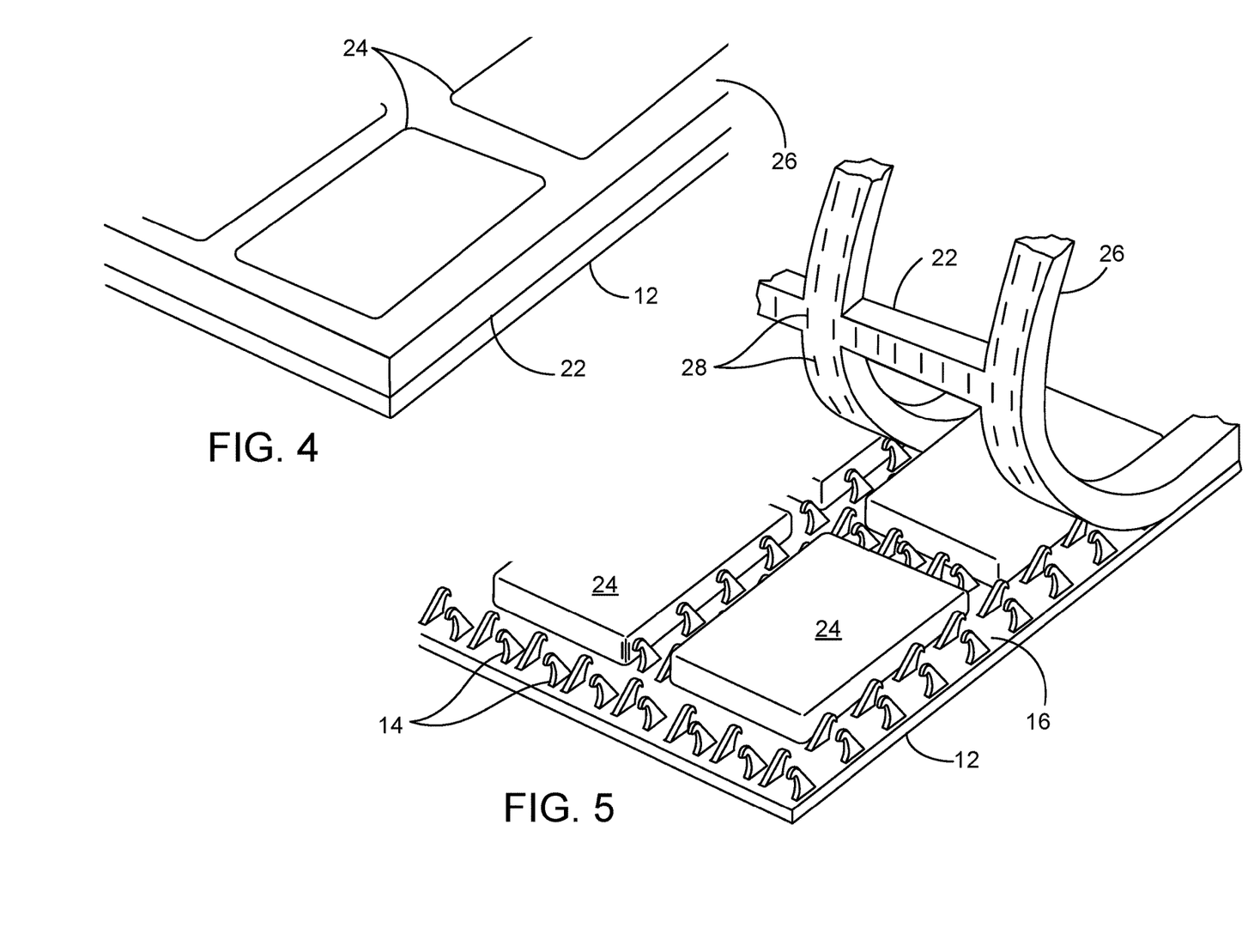
FIG. 4 is a perspective view of a portion of the hook tape and applied barrier material of FIG. 3, with the barrier material die cut into patches.
FIG. 5 shows a lattice of barrier material being stripped from the product of FIG. 4.

Referring next to FIGS. 2 and 4, after the flexible barrier material 22 is set on the hook tape, both are fed through a severing station 66 in which the flexible barrier material 22 is severed to form a pattern of patches 24 of flexible barrier material spaced apart and surrounded by a continuous lattice 26 of barrier material, with each of the patches and the lattice containing embedded male touch fastener elements. For example, the flexible barrier material 22 may be severed by die cutting through the flexible barrier material and not through the flexible base of the hook tape, such as by running the material through a die cutting station with a die cutting roller 68 having a pattern of blades 70 extending from it surface, with the pattern of blades corresponding with the pattern of patches. For ease of later processing, the die cut depth should be selected to penetrate essentially through the layer of barrier material, and even perhaps slightly into the hook tape base but not so far into the base to cause the base to separate at the edges of the patches in subsequent steps.

The patches 24 are preferably cut completely around their perimeters, and the lattice 26 should fully surround each patch. The patches 24 are shown rectangular in FIG. 4 for illustration, but in practice will be formed to have a desired shape for a fastening area of, for example, a seat cushion. In many cases the patches will not be in the form of narrow strips, but will be shaped such that the areas they cover will present wide fastening areas. The ratio of maximum to minimum lateral extent of a given patch 24 of flexible barrier material may be, for example, between 1.0 and 10. The location of individual male touch fastener elements need not be considered in the severing of the barrier material. Individual male touch fastener elements may be damaged or destroyed where the barrier material is cut, but sufficient functional male touch fastener elements will remain encased in the barrier material, both in the patches and in the lattice.

Referring next to FIGS. 2 and 5, the lattice 26 is then stripped from the upper surface 16 of the base 12 to expose male touch fastener elements 14 in exposed regions of the base surrounding each patch 24 of flexible barrier material 22. The patches 24 remain in place as the lattice 26 is stripped away and reprocessed. Again, the features shown are not to scale. In the width of an exposed region between patches 24, for example, there will typically be at least one row or column of male touch fastener elements, in some cases 4 to 6 rows or columns. And because the patches will not typically be rectangular in shape, the exposed regions of the base will vary in width across and along the material. The lattice 26 should strip away as a contiguous aperture sheet, exhibiting small holes 28 in an underside of the lattice where the lattice peeled off of individual male touch fastener elements.

Figure 6:
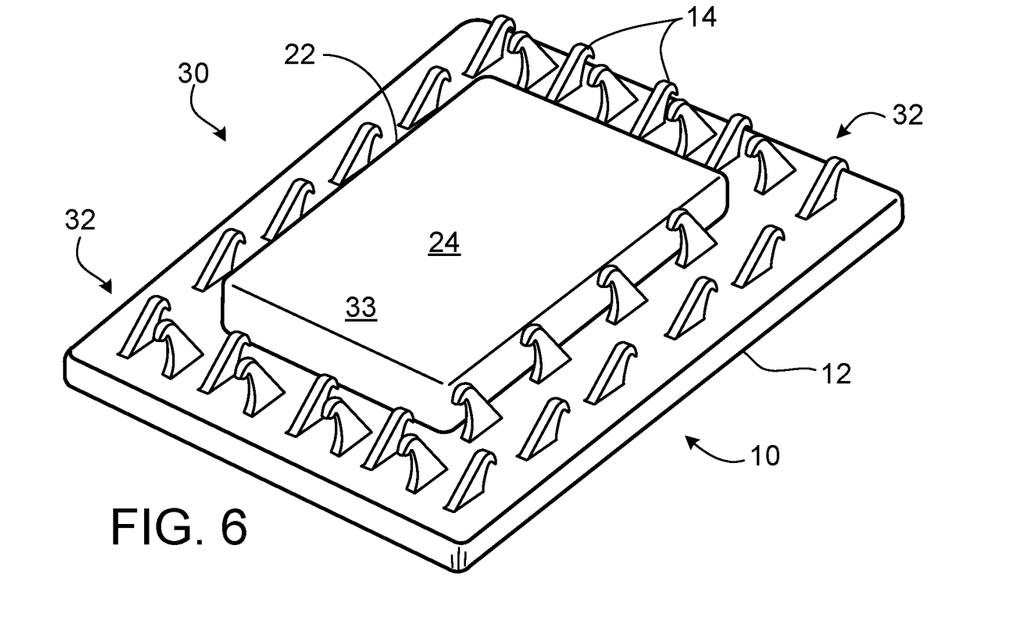
FIG. 6 is a perspective view of a single fastener product cut from the product shown in FIG. 5.

Referring next to FIGS. 2 and 6, after the lattice of barrier material has been removed the hook tape is severed along the exposed regions of the base to form individual mold-in fastener products 30, each having a patch 24 of flexible barrier material 22 surrounded by an exposed base edge region 32 carrying male touch fastener elements 14. In many cases, the hook tape will be severed such that the base edge region 32 is of generally constant width about the patch 24 and contains at least one spaced row or column of male touch fastener elements 14 across its width at any point about the patch perimeter. Preferably, the exposed base edge region 32 has a minimum width, measured from the patch of flexible barrier material, of between 2 and 20 percent of a minimum lateral extent of the patch of flexible barrier material. Note that the number of exposed male touch fastener elements has been reduced for illustration.

Severing the hook tape can be accomplished by die cutting through the flexible base 12 of the hook tape between the patches 24 of flexible barrier material, such as at a second die cutting station 66a, forming a severed base edge about the perimeter of each fastener product 30. The fastener products may be completely separated from a surrounding lattice of hook tape, such as by punching them out of the plane of the running tape at a separation station 72, and can be placed in packaging for transport to a customer. Alternatively, the die cutting knife pattern at die cutting station 66a can be arranged to leave small bridges of hook tape base connecting each fastener product to the surrounding lattice and the lattice and products together spooled as a continuous tape for transport and later separation. As with the severing of the barrier material, severing of the hook tape may be accomplished without regard to the position of the male touch fastener elements. Some male touch fastener elements will be damaged or destroyed at the severed edges of the fastener products, but a sufficient number of male touch fastener elements 14 will remain in the exposed base edge region 32. Thus, as shown in FIG. 6, each fastener product 32 includes a piece of flexible hook tape 10 carrying an array of touch fastener elements 14 extending from a surface of the flexible hook tape, the surface comprising a central region 33 in which the touch fastener elements are embedded in the patch 24 of flexible barrier material, and an edge region 32 surrounding the central region and in which touch fastener elements 14 are exposed.

Figure 6A:
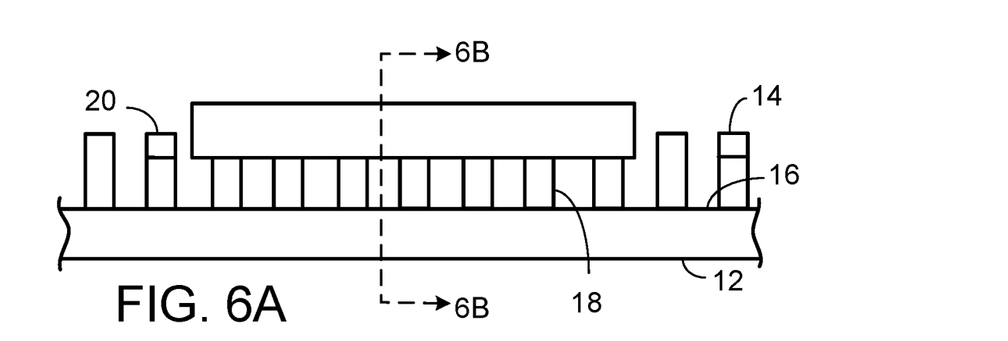
FIG. 6A is an end view of a hook tape with a patch of barrier material formed to encapsulate heads of some fastener elements.
Figure 6B:
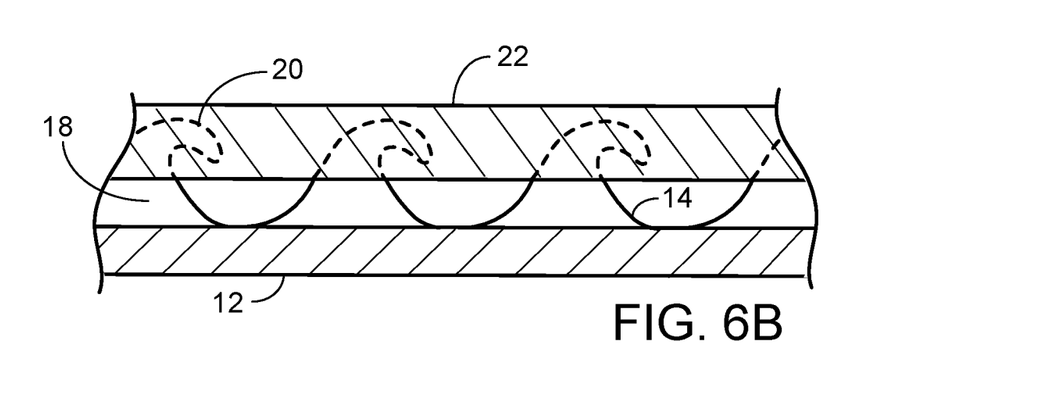
FIG. 6B is a cross-sectional view, taken along line 6B-6B of FIG. 6A.

Referring next to FIGS. 6A and 6B, in some cases the barrier material 22 is not formed to extend all the way to the surface 16 of base 12, but instead only encapsulates the heads 20 of the fastener elements 14, leaving portions of the stems 18 exposed. Preferably, the thickness of the gap between the base surface and the barrier material sufficiently small that foam intruding between the fastener element stems will chill and not intrude beyond a few rows of fastener elements nearest the patch edge, or will at least leave the heads sufficiently functional for engaging and retaining loops when the barrier material is removed.

Figure 7:
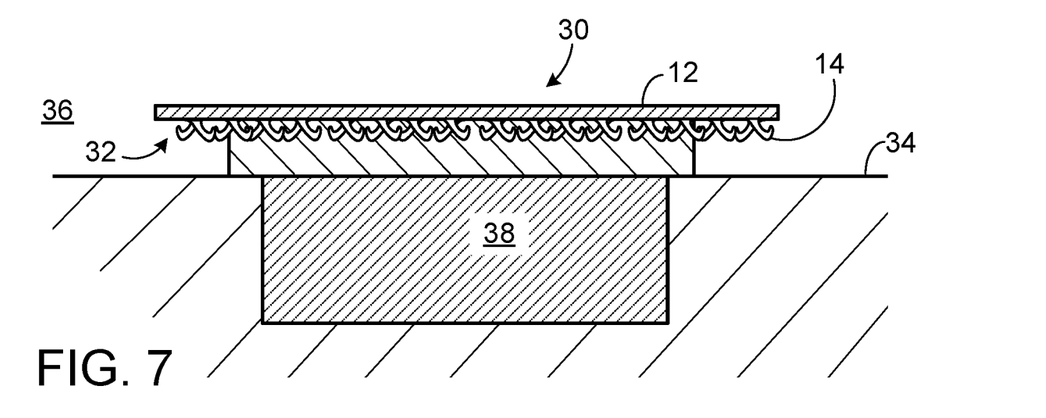
FIG. 7 is a partial cross-sectional view of the product of FIG. 6 held against an inner mold surface.

Referring next to FIG. 7, an individual touch fastener product 30 formed by the method described above may be placed against an inner surface 34 of a mold cavity 36. The touch fastener product 30 is placed such that the patch 24 of flexible barrier material is against the inner surface 34 and the exposed touch fastener elements 14 are facing the inner surface. The patch 24 is attracted to a magnet 38 embedded in the mold inner surface 34, which holds the touch fastener product firmly in place as foam is molded in the cavity. Notably, the male touch fastener elements exposed in the base edge region 32 about the patch are exposed at the edges of the touch fastener product and may be held somewhat spaced from the mold surface, depending on the thickness of patch 24.

Figure 8:
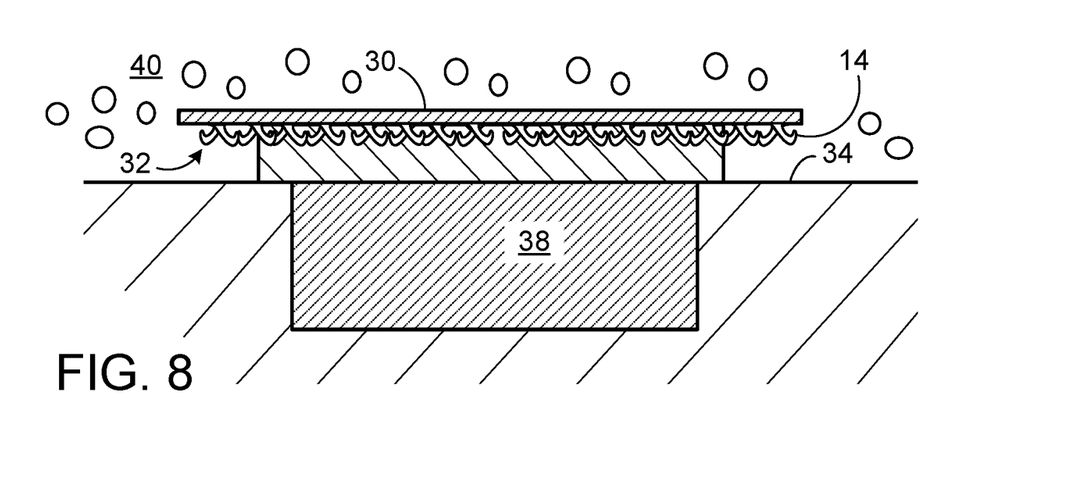
FIG. 8 shows the product of FIG. 7 after foam has filled the mold about the product to form a seat cushion.

Referring next to FIG. 8, with the touch fastener product 30 held in place against the mold cavity surface a flow of foamable resin is introduced to the mold cavity, such that the foamable resin expands and flows about the exposed touch fastener elements 14, effectively encasing the exposed base edge region 32 of the touch fastener product, including its touch fastener elements, in the foam. The expanded foamable resin is allowed to solidify into a molded foam cushion having the touch fastener product secured to its surface. The molded foam cushion is then removed from the mold cavity.

Figure 9:
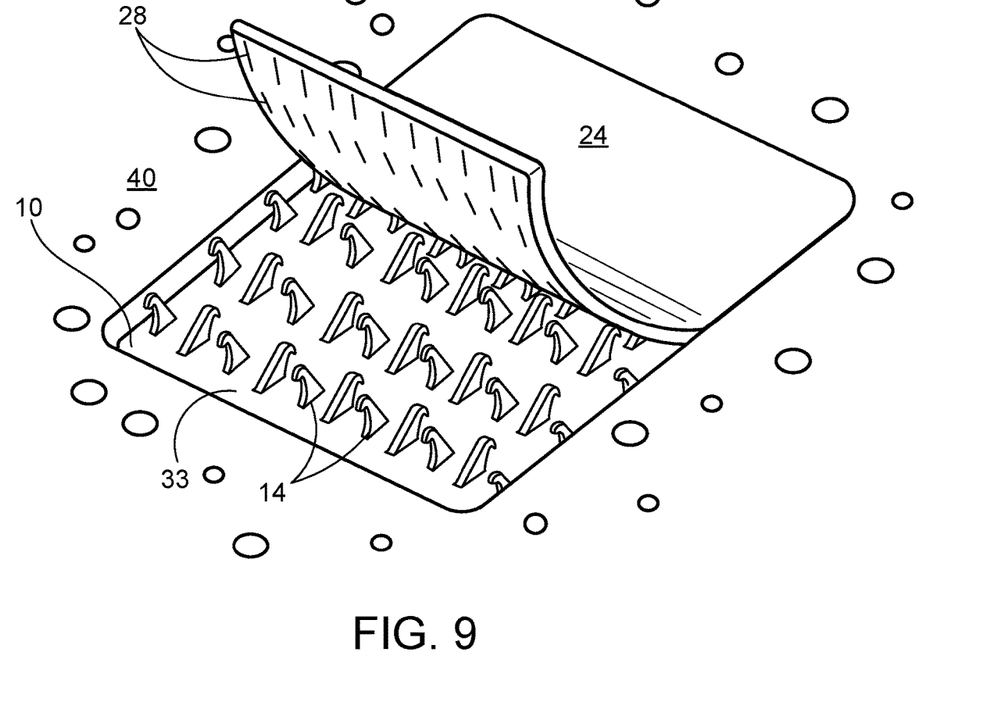
FIG. 9 shows a patch of barrier material being stripped from the product in the surface of the molded seat cushion.
Figure 10:
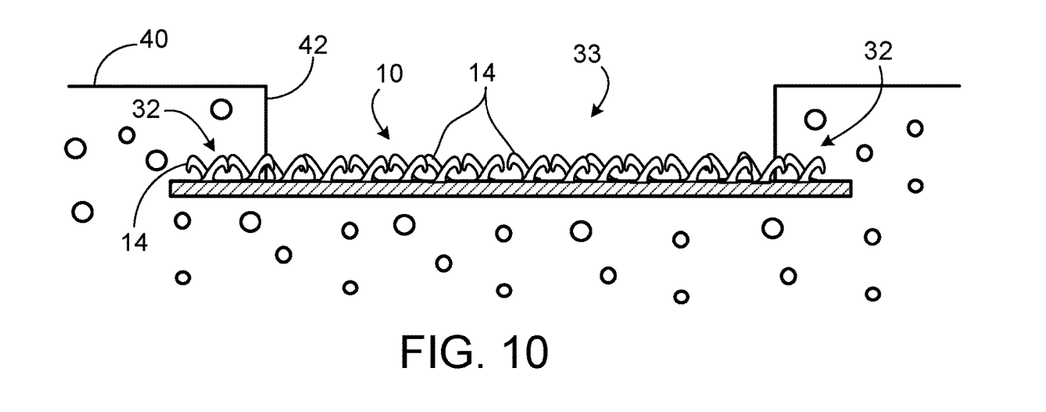
FIG. 10 is a cross-sectional view through the product in the molded foam seat cushion surface.

Referring next to FIGS. 9 and 10, in some cases the patch 24 of flexible barrier material will remain attached to the hook tape 10 as the molded foam cushion 40 is removed from the cavity. In such cases, the patch will be exposed at a surface of the molded foam cushion and can be stripped from the surface of the flexible hook tape 10 to expose the embedded touch fastener elements 14, leaving the piece of flexible hook tape secured to the cushion with the edge region embedded in molded foam.

In some other cases, magnetic attraction of the patch will be sufficient that the patch remains held against the mold surface as the molded cushion is removed. In such cases, the patch will then be separately removed from the mold cavity and discarded.

In either case, the barrier material will ideally be selected to not form a strong bond with the cushion foaming resin, such that the patch will readily separate from the molded foam without pulling the foam away from the embedded edge region of the hook tape. Removing the patch will leave a molded foam surface 42 facing the now exposed central region 33 of hook tape 10, in which the male touch fastener elements 14 that had been embedded in the patch are exposed and unobstructed to engage fibers of the underside of a cushion cover (not shown) to hold the cover to the cushion.

Figures 11, 12:
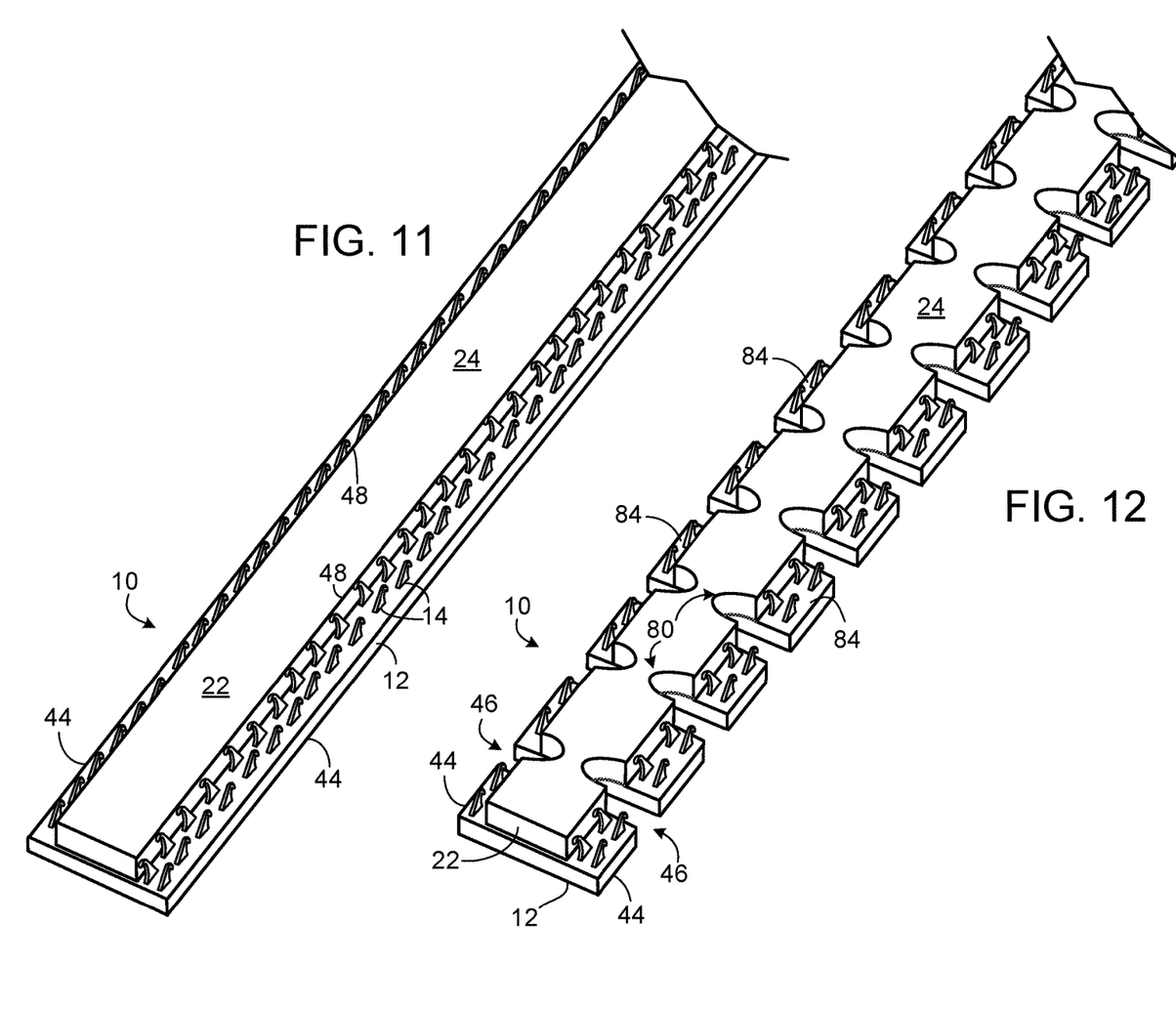
FIG. 11 is a perspective view of an intermediate hook tape with a strip of barrier material extending along a central portion of the hook tape.
FIG. 12 is a fastener product formed by die cutting the intermediate hook tape of FIG. 11.

Referring next to FIGS. 11 and 12, strip-form mold-in fastener products can be formed in a similar manner, such as by first forming a barrier material 22 to cover at least a central portion of a longitudinally continuous strip of hook tape 10, and then cutting through the longitudinal edges 44 of the flexible base 12 of the hook tape to form notches 46 extending toward a center of the hook tape. In some cases, the notches are also cut through longitudinal edges 48 of a longitudinal patch 24 of the barrier material that is spaced from the longitudinal edges of the flexible base. Opposed pairs of notches are separated by narrow bridges 80 that connect adjacent segments of hook tape defined between pairs of notches. The notches permit the strip-form hook tape to be bent in its plane, such as to follow the curvature of a trench in the mold.

In some cases, the barrier material is formed to extend across the entire width of the hook tape, as in FIG. 2, and severing the layer of barrier material also forms two strips of barrier material (not shown in FIG. 11) extending along the longitudinal edges of the base and separated by the continuous patch of barrier material. The strips of barrier material are then stripped away from the surface of the base to expose male touch fastener elements in exposed edge regions of the base, as shown in FIG. 11.

Figure 13:
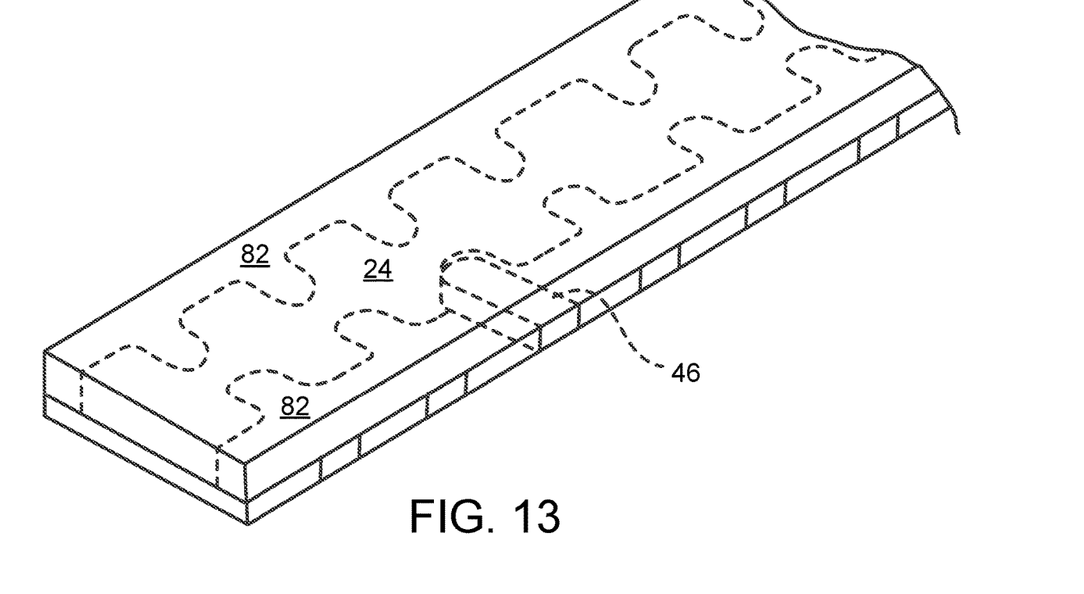
FIG. 13 is a perspective view of a covered preform strip of fastener product, showing die cut patterns.

In some cases, the layer of barrier material is die cut to separate the continuous patch from the strips 82, as shown in FIG. 13, with the die cutting following the contour of the notches 46 that have been or will be later cut through the hook tape edges, or that are concurrently cut through the hook tape edges, such as by an aligned die wheel cutting from the opposite side of the hook tape. In any sequence, what is left is the strip-form product of FIG. 12, which may be laid along an elongated trench in a foaming mold, with the barrier material patch not only protecting the embedded hooks from foam intrusion but also providing an attractive force in cooperation with magnets embedded in the mold wall along the trench, to hold the product in place during foaming. After foaming, the exposed edge regions 84 of each longitudinal segment are encapsulated in the foam, the exposed fastener elements in such regions helping to anchor the product in place. The barrier material patch 24 may then be stripped from the hook tape surface to expose the fastener elements along the central region for engagement.

Figure 14:
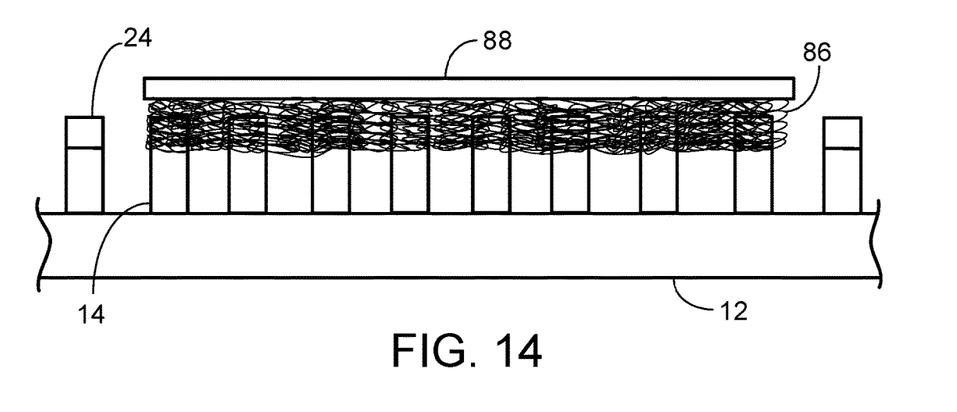
FIG. 14 is a partial end view of a fastener product, with fastener elements in a central area embedded in a textile fabric cover.

In the above-described examples, the barrier material features a contiguous layer of resin that encapsulates at least the heads of the fastener elements during and is later stripped away after the fastener product has been molded into a foam product such as a seat cushion. Referring to FIG. 14, the barrier material may alternatively be in the form of a textile fabric layer 86 in which the fastener element heads are embedded and which prevents foam intrusion about the heads during foaming. The textile fabric layer may be, for example, in the form of a non-woven material with a paper backing 88 to which the non-woven material is adhered. The textile fabric layer 86 may be applied to the hook side of the hook tape to cover the entire width of the tape, and then die cut and stripped away from the edge regions of the tape to expose fastener elements along the hook tape edges, with or without notching the hook tape edges, as discussed above with respect to FIGS. 11-13, or may be die cut to form spaced-apart patches and a lattice, as discussed above with respect to FIGS. 4-6. After foaming, the patch of textile fabric covering the fastener elements can be stripped away to expose the fastener elements to use. Any foam that intruded under the edges of the patch and into the fabric layer may strip away with the textile fabric. A magnetically attractable material such as a wire (not shown) may be disposed between the textile fabric and the paper backing, for holding the product in the mold.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of making mold-in fastener products, the method comprising
    severing a layer of flexible barrier material on a surface of a longitudinally continuous hook tape having a flexible base and an array of discrete male touch fastener elements extending from a surface of the base, to form a pattern of patches of flexible barrier material spaced apart and surrounded by a continuous lattice of barrier material, with each of the patches and the lattice engaging respective groups of the male touch fastener elements;
    stripping the lattice from the surface of the base to expose the male touch fastener elements in exposed regions of the base surrounding each of the patches of flexible barrier material; and
    severing the hook tape along the exposed regions of the base to form individual mold-in fastener products, each comprising one of the patches of flexible barrier material surrounded by an exposed base edge region carrying the exposed male touch fastener elements.

2. The method of claim 1, further comprising, prior to severing the layer of flexible barrier material, forming the layer of flexible barrier material on the surface of the base, such that the male touch fastener elements are at least partially embedded in the layer of flexible barrier material.

3. The method of claim 2, wherein forming the layer of flexible barrier material comprises extruding a continuous flow of barrier material onto the surface of the base and allowing the extruded flow of barrier material to set.

4. The method of claim 2, wherein the layer of flexible barrier material is formed to encapsulate heads of the male touch fastener elements.

5. The method of claim 4, wherein the layer of flexible barrier material is formed to have a thickness, measured from the surface of the base, sufficient to completely cover the embedded male touch fastener elements.

6. The method of claim 2 further comprising, prior to forming the layer of flexible barrier material, forming the longitudinally continuous hook tape.

7. The method of claim 6, wherein forming the longitudinally continuous hook tape comprises forming the flexible base against a surface of a rotating mold roll while molding at least stems of the male touch fastener elements in discrete cavities defined in the mold roll, and then stripping the flexible base from the mold roll surface, thereby extracting the molded stems from the cavities.

8. The method of claim 7, wherein the cavities are shaped to mold both the stems and the heads of the male touch fastener elements.

9. The method of claim 1, wherein each of the patches and the lattice contain embedded male touch fastener elements.

10. The method of claim 1, wherein the flexible barrier material comprises an elastomer.

11. The method of claim 1, wherein the flexible barrier material comprises a textile sheet.

12. The method of claim 1, wherein the hook tape comprises a magnetically attractable material.

13. The method of claim 1, wherein the male touch fastener elements each has a stem formed contiguously with the surface of the base, and a head disposed at a distal end of the stem and overhanging the surface of the base.

14. The method of claim 1, wherein the flexible barrier material comprises a magnetically attractable material.

15. The method of claim 14, wherein the magnetically attractable material is in the form of particles suspended in a resin matrix.

16. The method of claim 1, wherein a ratio of maximum to minimum lateral extent of the patch of flexible barrier material is between 1.0 and 10.

17. The method of claim 1, wherein severing the flexible barrier material comprises die cutting through the flexible barrier material and not through the flexible base of the hook tape.

18. The method of claim 1, wherein severing the hook tape comprises die cutting through the flexible base of the hook tape between the patches of flexible barrier material.

* * * * *